US008459557B2

(12) United States Patent
Havens et al.

(10) Patent No.: US 8,459,557 B2
(45) Date of Patent: Jun. 11, 2013

(54) DUAL LASER SCANNING CODE SYMBOL READING SYSTEM EMPLOYING AUTOMATIC OBJECT PRESENCE DETECTOR FOR AUTOMATIC LASER SOURCE SELECTION

(75) Inventors: William H. Havens, Syracuse, NY (US); Stephen Colavito, Garnet Valley, PA (US); Christopher Allen, East Windsor, NJ (US); Robert Blake, Woodbury Heights, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/044,897

(22) Filed: Mar. 10, 2011

(65) Prior Publication Data

US 2012/0228382 A1    Sep. 13, 2012

(51) Int. Cl.
*G06K 7/10* (2006.01)

(52) U.S. Cl.
USPC ............ 235/462.31; 235/462.1; 235/462.22; 235/462.23; 235/462.3

(58) Field of Classification Search
USPC ..... 235/462.1, 462.22–462.23, 462.3–462.31
See application file for complete search history.

(56) References Cited

U.S. PATENT DOCUMENTS

| 863,217 | A | 8/1907 | Prescott |
|---|---|---|---|
| 4,877,949 | A | 10/1989 | Danielson et al. |
| 5,340,971 | A | 8/1994 | Rockstein et al. |
| 5,420,411 | A | 5/1995 | Salatto, Jr. et al. |
| 5,945,658 | A * | 8/1999 | Salatto et al. ............ 235/462.22 |
| 6,223,988 | B1 | 5/2001 | Batterman et al. |
| 6,575,369 | B1 * | 6/2003 | Knowles et al. ......... 235/462.31 |
| 6,863,217 | B2 | 3/2005 | Hudrick et al. |
| 7,014,114 | B2 * | 3/2006 | Maiman ........................ 235/454 |
| 7,055,747 | B2 * | 6/2006 | Havens et al. ............ 235/462.22 |
| 7,748,629 | B2 | 7/2010 | Brock |

* cited by examiner

*Primary Examiner* — Thien M Le
*Assistant Examiner* — Toan Ly
(74) *Attorney, Agent, or Firm* — Summa, Addition & Ashe, P.A.

(57) ABSTRACT

Method of and system for reading code symbols a dual-laser scanning bar code symbol reading system having the capacity to automatically select in a user-transparent manner, and activate either a near-field source of laser illumination, or a far-field source of laser illumination, using an automatic object presence detection subsystem in the near-field portion of the laser scanning field.

24 Claims, 8 Drawing Sheets

DUAL LASER SCANNING CODE SYMBOL READING SYSTEM EMPLOYING AUTOMATIC OBJECT PRESENCE DETECTOR FOR AUTOMATIC LASER SOURCE SELECTION

BACKGROUND

1. Field of Disclosure

The present disclosure relates to an improved method of and apparatus for selecting the correct laser source in a dual laser scanning code symbol reading system, depending on whether an object is present within the near portion or far portion of the laser scanning field of the system.

2. Brief Overview of the State of the Art

U.S. Pat. Nos. 5,420,411 and 5,945,658 disclose dual laser scanning code symbols reading systems having the capacity to scan code symbols using either (i) a first laser source focused over a near portion of the laser scanning field, or (ii) a second laser source focused over a far portion of the laser scanning field.

Typically, prior art dual laser scanning systems employ number of algorithms for selecting between either near-field and far-field laser sources, depending on where the target object is located within the laser scanning field at any moment in time.

However, such conventional methods of laser source selection can be costly to implement, can result in erroneous performance, and can add unnecessary complexity to dual laser scanning systems.

There is a great need in the art to provide an improved method of selecting the correct laser source in a dual laser scanning code symbol reading system, whenever an object is present within the near portion or far portion of the laser scanning field of such laser scanning systems.

OBJECTS OF PRESENT DISCLOSURE

A primary object of the present disclosure is to provide an improved method of and apparatus for selecting the correctly focused laser source when an object is present within either the near portion or far portion of the laser scanning field of a dual laser scanning code symbol reading system.

Another object is to provide a system for reading code symbols using a dual-laser scanning bar code symbol reading system having the capacity to automatically select in a user-transparent manner, and activate either a near-field source of laser illumination, or a far-field source of laser illumination, using an automatic object presence detection subsystem in the near portion of the laser scanning field.

Another object is to provide a hand-supportable dual laser scanning code symbol reading system that employs an IR presence sensor which automatically responds to the presence of a light reflective object present in the near portion of the laser scanning field of the dual laser scanning code symbol reading system.

Another object is to provide a fixed-mount dual laser scanning system that employs an IR presence sensor which automatically responds to the presence of a light reflective object present in the near portion of the laser scanning field of the dual laser scanning system.

Another object of the present disclosure is to provide a dual laser scanning code symbol reading system employing an IR presence detection module mounted in the front of its light transmission window so that the IR light transmitter and IR light receiver have an unobstructed view of an object in the laser scanning field of the system.

Another object of the present invention is to provide an improved method of automatically reading bar code symbols over a large depth of field using a dual laser scanning system employing an IR object presence detector for detecting whether or not an object is located within the near-field region or far-field region of the system.

Another object of the present invention is to provide a dual laser scanning code symbol reading system employing an IR object presence detector which can transmit IR signals having a continuous low-intensity output level, or having pulsed higher-intensity output level to increase the object detection range of the system.

Further objects of the present disclosure will become more apparently understood hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein.

DETAILED DESCRIPTION OF THE ILLUSTRATIVE EMBODIMENTS

Referring to the figures in the accompanying Drawings, the illustrative embodiments of the dual laser-scanning bar code

Manually Triggered Hand-Supportable Dual Laser Scanning Bar Code Symbol Reading System Referring now to FIGS. 1 through 3B, a first illustrative embodiment of a manually-triggered hand-supportable dual-laser scanning bar code symbol reading system 1 will be described in detail.

Figure 1:
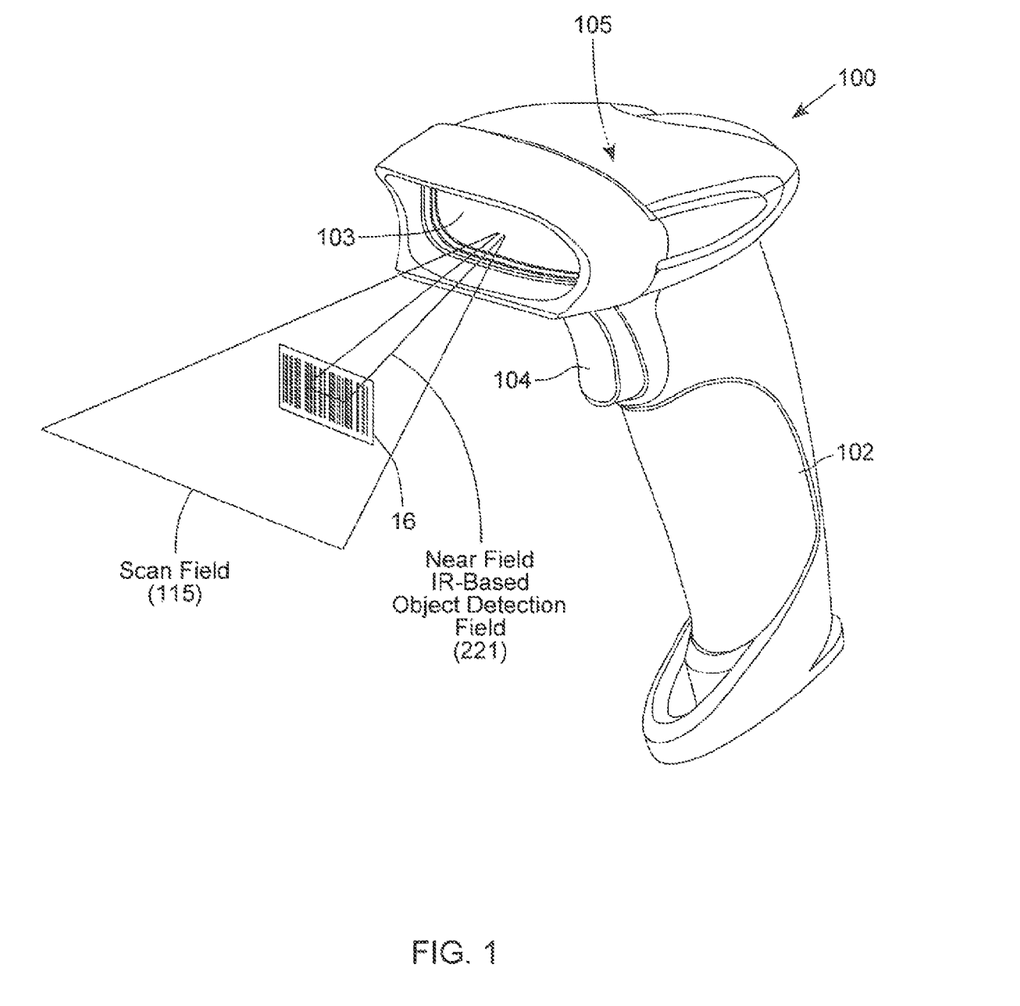
FIG. 1 is a perspective view of an illustrative embodiment of a manually-triggered hand-supportable dual-laser scanning bar code symbol reading system, having the capacity to automatically select and activate either a near-field source of laser illumination, or a far-field source of laser illumination, using an automatic object presence detection subsystem in the near-field portion of the laser scanning field.
Figure 2:
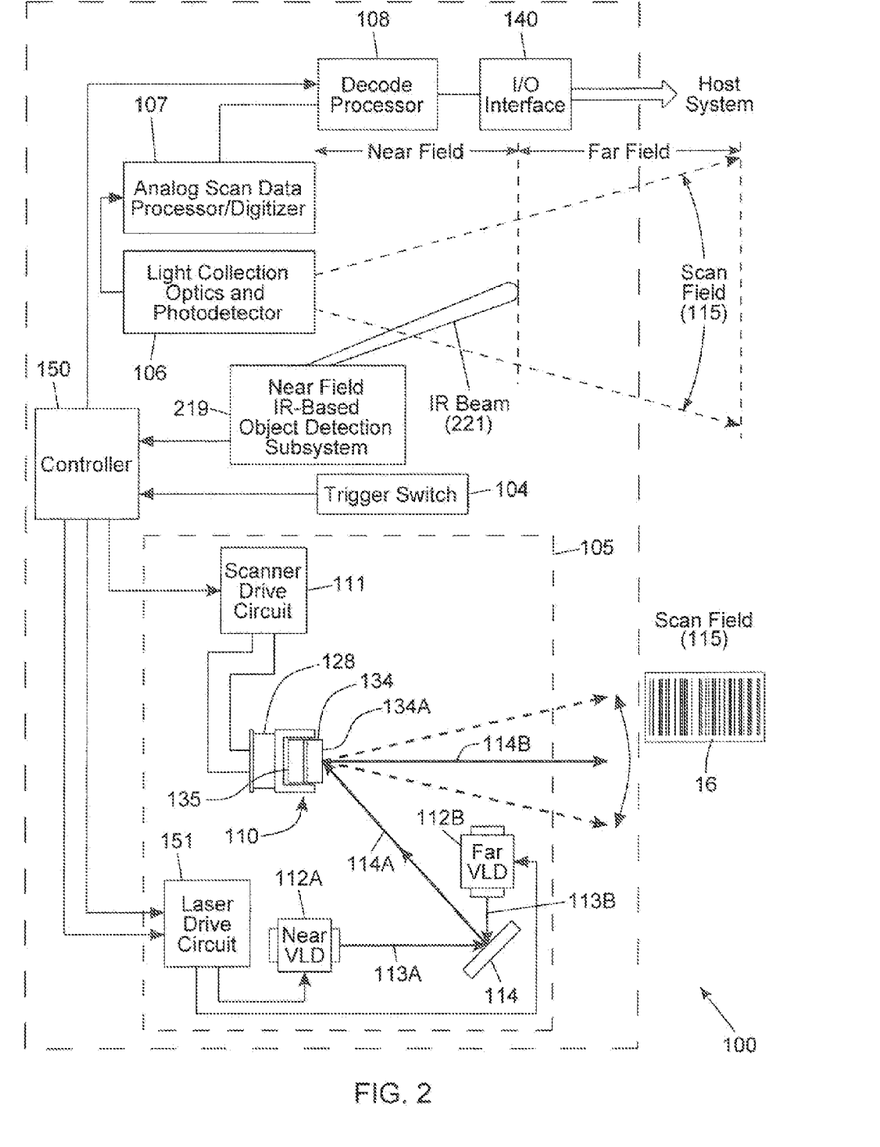
FIG. 2 is a schematic block diagram describing the major system components of the manually-triggered dual-laser scanning bar code symbol reading system illustrated in FIG. 1.

As shown in FIGS. 1 and 2, the manually-triggered laser scanning bar code symbol reader 100 comprises: a hand-supportable housing 102 having a head portion and a handle portion supporting the head portion; a light transmission window 103 integrated with the head portion of the housing 102; a manually-actuated trigger switch 104 integrated with the handle portion of the housing, for activating its laser scanning module 105 with a laser scanning field 115; a near-field IR-based object detection subsystem 219 generating an IR beam within the near portion of the laser scanning field, as shown in FIG. 2, for automatically detecting the presence of an object in the near portion of the laser scanning field, and triggering the system when an object is automatically detected in the near portion of the scanning field; a laser scanning module 105, for repeatedly scanning, across the laser scanning field, either (i) a visible laser beam generated by a near-field laser source 112A (e.g. VLD or IR LD) having optics to produce a laser scanning beam focused in the near portion of the laser scanning field, in response to a first control signal generated by a system controller 150 when the module 105 is operating in its near-field laser illumination mode of operation, or (ii) a visible laser beam generated by a far-field laser source 112B (e.g. VLD or IR LD) having optics to produce a laser scanning beam focused in the far portion of the laser scanning field, in response to a second control signal generated by the system controller 150 when the module 105 is operating in its far-field laser illumination mode of operation, wherein the mode of operation depends on the results of real-time analysis performed by the system controller 150 while carrying out the method of operation, specified in FIG. 3; wherein the laser scanning module 105 also includes a laser drive circuit 151 for receiving first and second control signals from system controller 150, and in response thereto, generating and delivering first and second laser (diode) drive current signals to the near-field laser source 112A and the far-field laser diode source 112B, respectively, to selectively produce near-field and far-field laser scanning beams during the method of bar code symbol reading described in FIG. 3; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; programmed decode processor 108 for decode processing digitized data signals, and generating symbol character data representative of each bar code symbol scanned by either a visible or invisible laser scanning beam; an input/output (I/O) communication interface module 140 for interfacing with a host communication system and transmitting symbol character data thereto via wired or wireless communication links that are supported by the symbol reader and host system; and a system controller 150 for generating the necessary control signals for controlling operations within the hand-supportable laser scanning bar code symbol reading system.

Preferably, IR-based object detection subsystem 219 is mounted in the front of its light transmission window 103 so that the IR light transmitter and IR light receiver components of subsystem 219 have an unobstructed view of an object within the laser scanning field of the system, as shown in FIG. 1. Also, the IR object presence detection module 219 can transmit into the scanning field 115, IR signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

As shown in FIG. 2, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a near-field laser beam source 112A for producing a near-field visible laser beam 113A and far-field laser beam source 112B for producing a far-field visible laser beam 113B; and a beam deflecting mirror 114 for deflecting the laser beam 113A, or 113B (depending on which laser source is enabled at any instant in time by system controller 150) as incident beam 114A towards the mirror component of the laser scanning assembly 110, which sweeps the deflected laser beam 114B across the laser scanning field and a bar code symbol 16 that might be simultaneously present therein during system operation.

As shown in FIG. 2, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a drive circuit 111 so that it generates magnetic forces on opposite poles of the permanent magnet 135, during scanning assembly operation.

In general, system 100 supports a manually-triggered triggered mode of operation, and the bar code symbol reading method described below.

In response to a triggering event (i.e. manually pulling trigger 104), the laser scanning module 105 generates and projects a laser scanning beam through the light transmission window 103, and across the laser scanning field external to the hand-supportable housing, for scanning an object in the scanning field. The laser scanning beam is generated by either the near-field laser beam source 112A or the far-field laser beam source 112B, in response to control signals generated by the system controller 150. The scanning element (i.e. mechanism) 134 repeatedly scans the selected laser beam across a code symbol residing on an object in the near portion or far portion of the laser scanning field 115. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by either a near-field or far-field laser scanning beam. Symbol character data corresponding to the bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system.

Figure 3A:
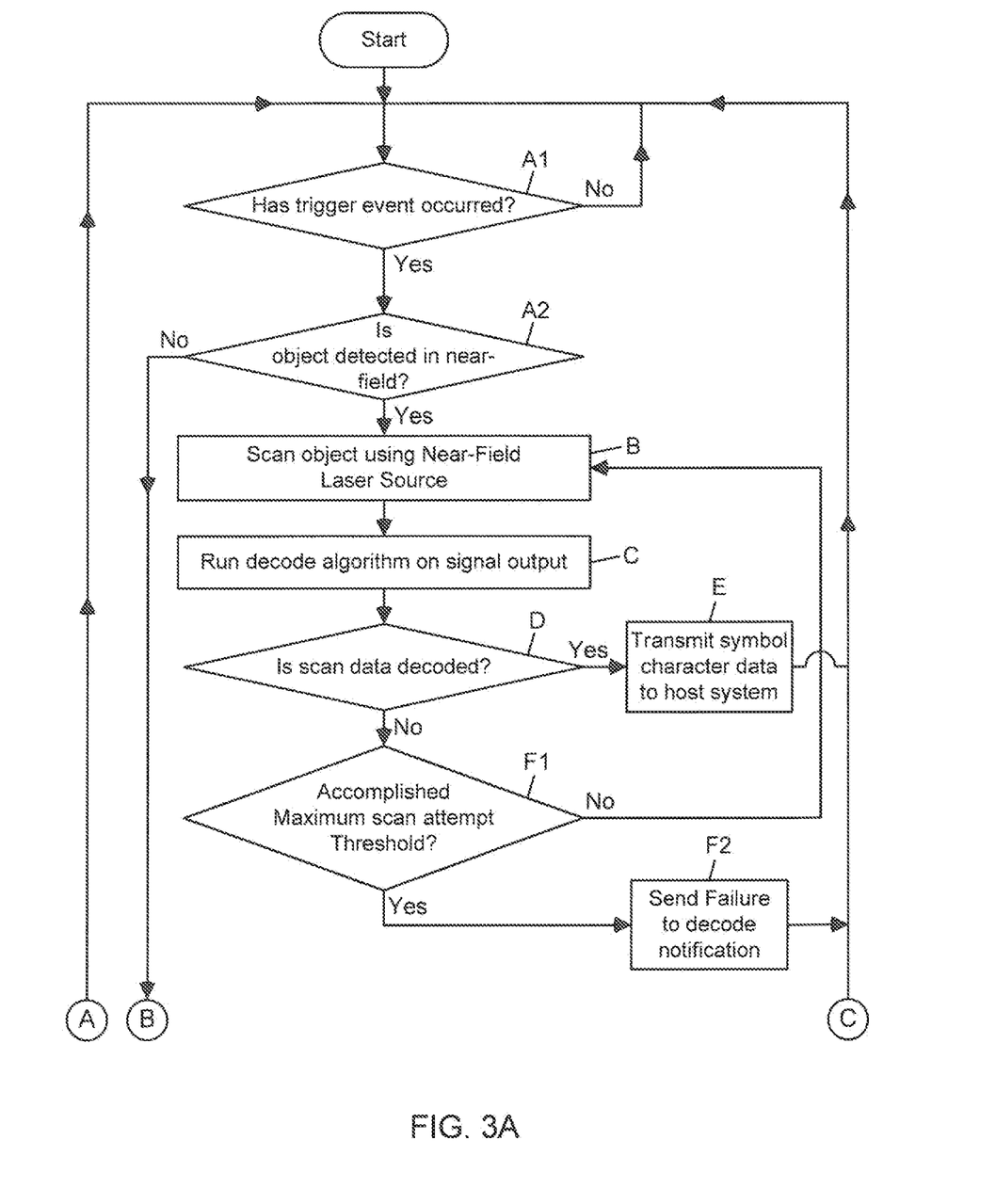
FIGS. 3A and 3B, taken together, set forth a flow chart describing the primary steps carried out in the manually-triggered dual-laser scanning bar code symbol reading system of FIG. 1, wherein a near-field source of laser illumination or a far-field source of laser illumination is automatically selected and activated during laser scanning operations, depending on whether the object is located in either the near-field portion or far-field portion of the laser scanning field.
Figure 3B:
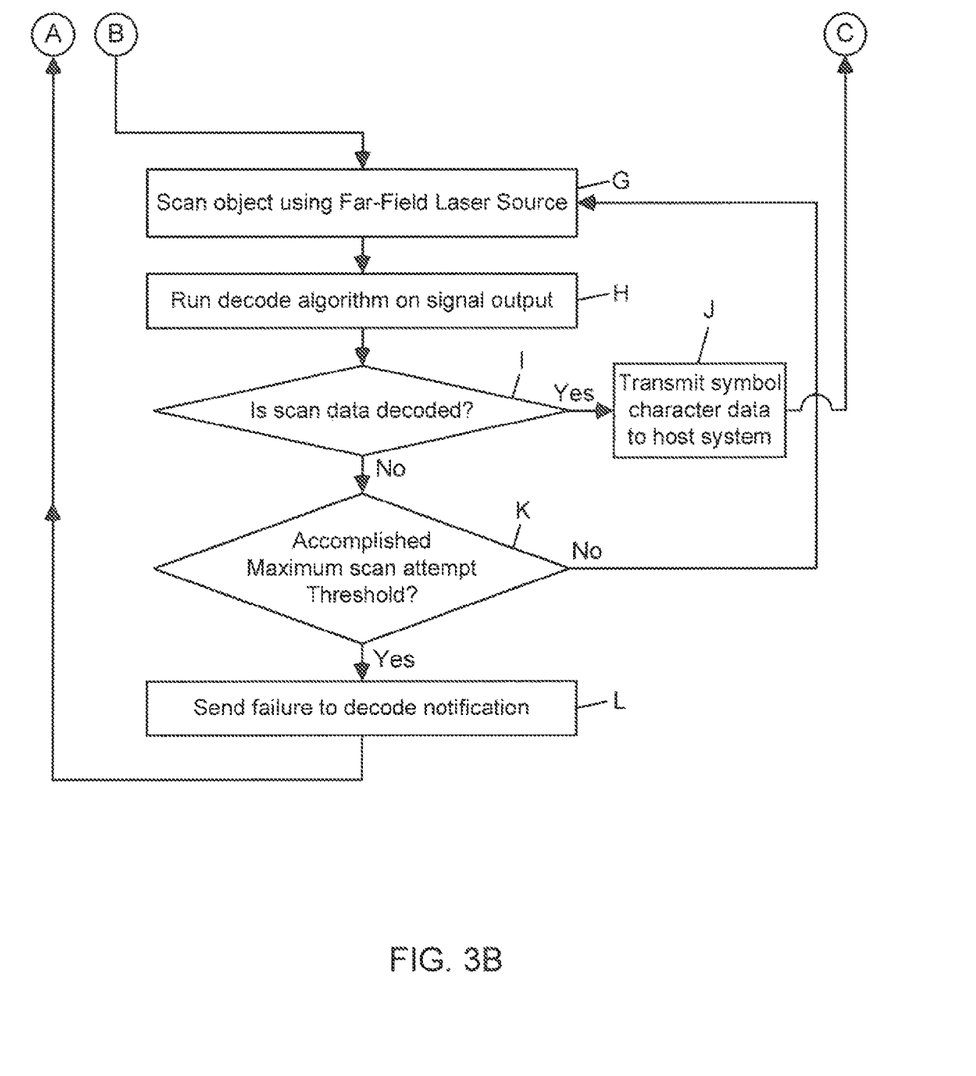

Referring to FIGS. 3A and 3B, the method of reading bar code symbols and controlling operations within the laser scanning bar code reader 100 will be described in greater detail.

As indicated in FIG. 3A, the process orchestrated by system controller 150 begins at the START Block. Then at Block A1 in FIG. 3A, the system controller determines if a trigger event has occurred (i.e. whether or not trigger 104 has been manually depressed by the operator upon seeing an object in the laser scanning field and pointing the head portion of the housing towards the object). In the event that a trigger event has been detected at Block A1, then the system is activated and the system controller determines at Block A2 whether or not the IR object presence detection subsystem 219 detects the object in the near portion of the laser scanning field 115. If IR object presence detection subsystem 219 detects an object in the near portion of the scanning field 115, then at Block B, the system controller 150 directs the laser scanning module 105 to scan the detected object with a laser beam generated by the near-field VLD 112A.

At Block C, the decode processor 108 runs a decode algorithm on the captured scan data, and if at Block D, a bar code symbol is decoded, then at Block E, the produced symbol character data is transmitted to the host system, and the system controller returns to Block A1. If, however, at Block D a bar code symbol is not decoded, then the system controller 150 determines at Block F1 whether or not the maximum scan attempt threshold has been reached, and if not, then the system controller 150 returns to Block B, and resumes the flow as indicated. However, if at Block F1, the system controller 150 determines that the maximum scan attempt threshold has been accomplished, then the system controller 150 proceeds to Block F2 and sends a Failure to Decode notification to the operator and returns to Block A1.

If at Block A2 an object is not detected in the near portion of the laser scanning field, then at Block G in FIG. 3B, the system controller directs the laser scanning module 105 to scan the detected object with a laser beam generated by the far-field VLD 112B. Then at Block H, one or more decode algorithms are run on the collected scan data, and at Block I, the system controller 150 determines whether or not a bar code symbol is decoded by the decode processor 108. If at Block I a bar code symbol is decoded, then at Block J the produced symbol character data is transmitted to the host system, and system control returns to Block A1, as shown in FIG. 3. If, however, at Block I, no bar code symbol is decoded, then the system controller 150 determines whether or not the maximum scan attempt threshold (i.e. how many attempts to decode are permitted) has been reached, and so long as the maximum number has not been reach, the system controller 150 maintains a control loop between Blocks K and G, as indicated in FIG. 3B. When the maximum number of attempts to decode has been reached at Block K, then system controller 150, optionally, sends a Failure to Decode notification to the operator, and the system returns to Block A1, as shown in FIG. 3A.

The above method of reading bar code symbols and controlling system operations is carried out in an automated manner within the laser scanning bar code symbol reader 100, wholly transparent to the operator who is holding the system in his or her hand. By virtue of this unique method of control, the system is capable of reading both bar code symbols in near and far portions of the laser scanning field, in a user-transparent manner using laser source switching during laser scan data capture and processing operations, without the complexities presented by prior art techniques and technologies.

Automatically-Triggered Hand-Supportable Dual Laser Scanning System

Referring to FIGS. 4 through 6B, a second illustrative embodiment of an automatically-triggered hand-supportable dual laser scanning bar code symbol reading system 500 will be described in detail.

Figure 4:
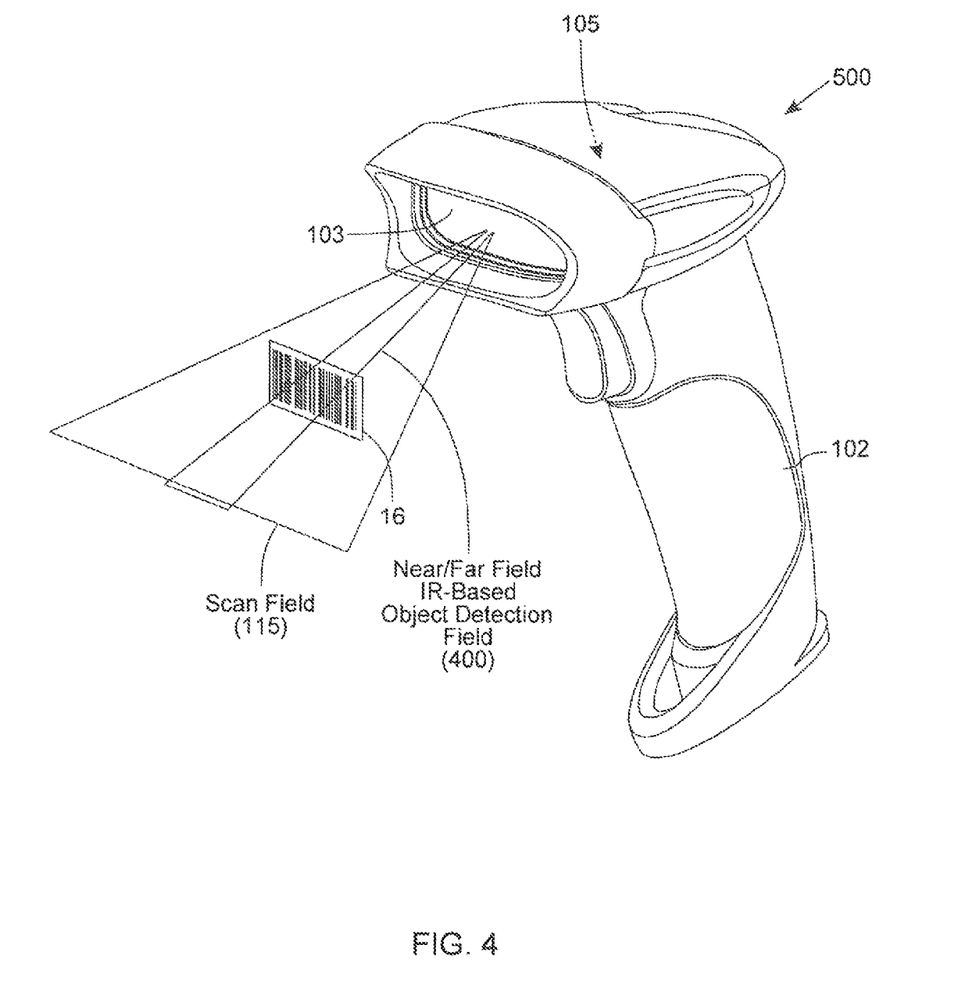
FIG. 4 is a perspective view of an illustrative embodiment of an automatically-triggered hand-supportable dual-laser scanning bar code symbol reading system, having the capacity to automatically select and activate either a near-field source of laser illumination, or a far-field source of laser illumination, using an automatic object presence detection subsystem deployed within both near-field and far-field portions of the laser scanning field.
Figure 5:
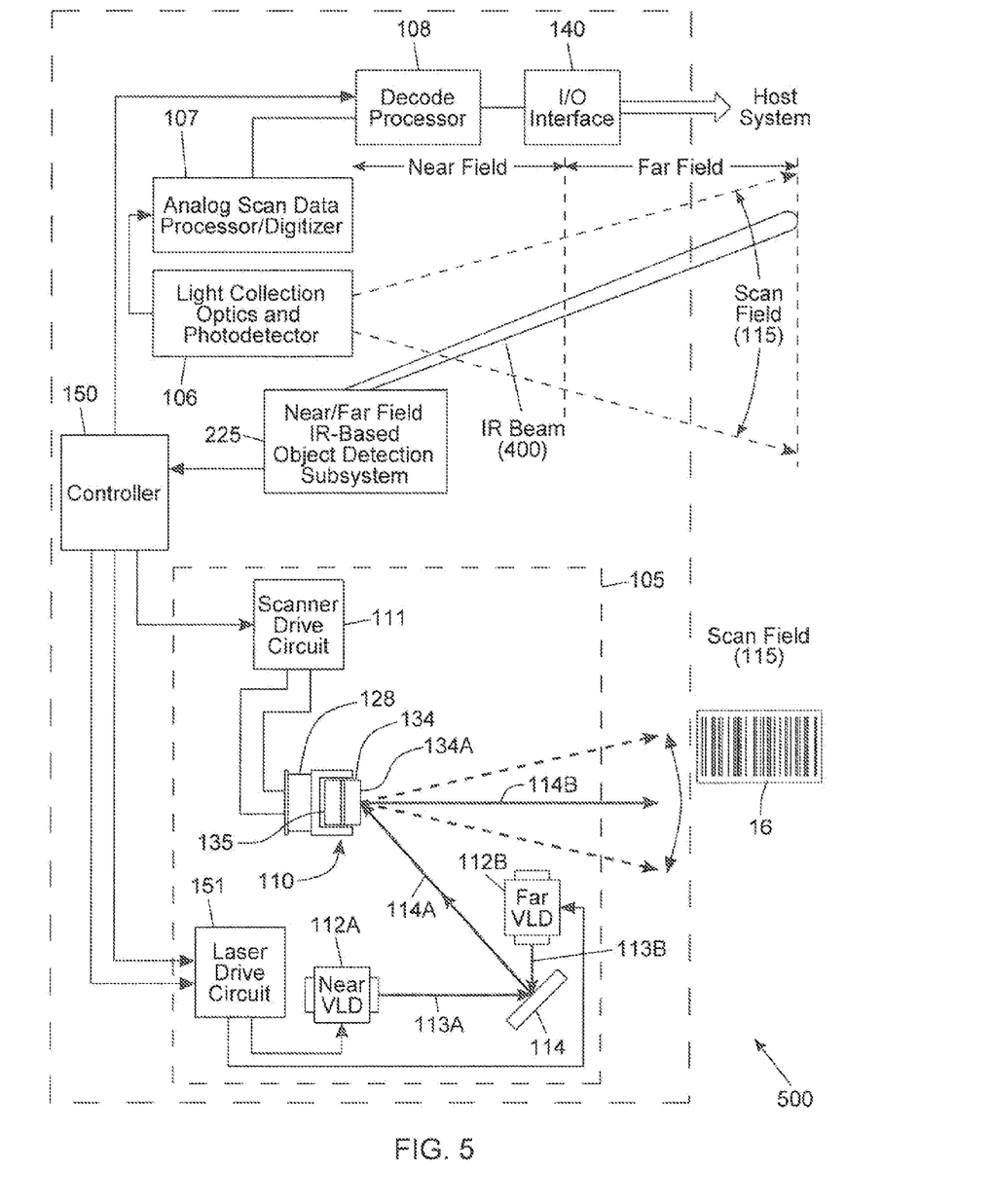
FIG. 5 is a schematic block diagram describing the major system components of the automatically-triggered dual-laser scanning bar code symbol reading system illustrated in FIG. 1.

Referring now to FIGS. 4 through 6, a second illustrative embodiment of an automatically-triggered hand-supportable dual-laser scanning bar code symbol reading system 1 will be described in detail.

As shown in FIGS. 4 and 5, the manually-triggered laser scanning bar code symbol reader 500 comprises: a hand-supportable housing 102; having a head portion and a handle portion supporting the head portion; a light transmission window 103 integrated with the head portion of the housing 102; a near/far field IR-based object detection subsystem 225 disposed in with the head portion of the housing, for generating and IR beam within the near-field and far-field portions of the laser scanning field, as shown in FIG. 5, for automatically detecting whether or not an object is present in near or far field portions of the laser scanning field, and if so, then automatically activating (i.e. triggering) the system including laser scanning module 105 to carrying out laser scan data capture and processing operations; a laser scanning module 105, for repeatedly scanning, across the laser scanning field, either (i) a visible laser beam generated by a near-field laser source 112A (e.g. VLD or IR LD) having optics to produce a laser scanning beam focused in the near portion of the laser scanning field, in response to a first control signal generated by a system controller 150 when the module 105 is operating in its near-field laser illumination mode of operation, or (ii) an visible laser beam generated by a far-field laser source 112B (e.g. VLD or IR LD) having optics to produce a laser scanning beam focused in the far portion of the laser scanning field, in response to a second control signal generated by the system controller 150 when the module is operating in its far-field laser illumination mode of operation, wherein the mode of operation depends on the results of real-time analysis performed by the system controller 150 while carrying out the method of operation, specified in FIG. 6; wherein the laser scanning module 105 also includes a laser drive circuit 151 for receiving first and second control signals from system controller 150, and in response thereto, generating and delivering first and second laser (diode) drive current signals to the near-field laser source 112A and the fair-field laser diode source 112B, respectively, to selectively produce near-field and far-field laser scanning beams during the method of bar code symbol reading described in FIG. 6; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; programmed decode processor 108 for decode processing digitized data signals, and generating symbol character data representative of each bar code symbol scanned by either a visible or invisible laser scanning beam; an input/output (I/O) communication interface module 140 for interfacing with a host communication system and transmitting symbol character data thereto via wired or wireless communication links that are supported by the symbol reader and host system; and a system controller 150 for generating the necessary control signals for controlling operations within the hand-supportable laser scanning bar code symbol reading system.

Preferably, IR-based object detection subsystem 225 is mounted in the front of its light transmission window so that the IR light transmitter and IR light receiver of subsystem 225 have an unobstructed view of an object within the laser scanning field of the system. Also, IR object presence detection module 225 can transmit IR signals having a continuous low-intensity output level, or having pulsed higher-intensity output level which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

As shown in FIG. 5, the laser scanning module 105 comprises a number of subcomponents, namely: laser scanning assembly 110 with an electromagnetic coil 128 and rotatable or oscillating scanning element 134 supporting a lightweight reflective element; a coil drive circuit 111 for generating an electrical drive signal to drive the electromagnetic coil 128 in the laser scanning assembly 110; and a near-field laser beam source 112A for producing a near-field visible laser beam 113A and far-field laser beam source 112B for producing a far-field visible laser beam 113B; and a beam deflecting mirror 114 for deflecting the laser beam 113A, or 113B from either laser beam source 112A or 112B (depending on which source is enabled at any instant in time by system controller 150), towards the mirror component 134A of the laser scanning assembly 110, which sweeps the laser beam 114B across its scan field and one or more bar code symbols 16 that might be simultaneously present in such a laser scanning field 115 during system operation.

As shown in FIG. 5, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a drive circuit 111 so that it generates magnetic forces on opposite poles of the permanent magnet 135, causing mirror component 134 to oscillate about its axis of rotation, during scanning assembly operation.

In general, system 500 supports an automatically-triggered mode of operation, and a bar code symbol reading method described below.

In response to the automatic detection of an object in the laser scanning field 115, by IR-based object presence detection subsystem 225, the laser scanning module 105 generates and projects a laser scanning beam through the light transmission window 103, and across the laser scanning field 115 external to the hand-supportable housing, for scanning an object in the scanning field. The laser scanning beam is generated by either the near-field laser source 112A or the far-field laser source 112B in response control signals generated by the system controller 150. The scanning element (i.e. mechanism) 134 repeatedly scans the near-field laser beam, or far-field laser beam, depending on the location of the object in the laser scanning field during system operation. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by either a visible or invisible laser scanning beam. Symbol character data corresponding to the visible and/or invisible bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system 500.

Figure 6A:
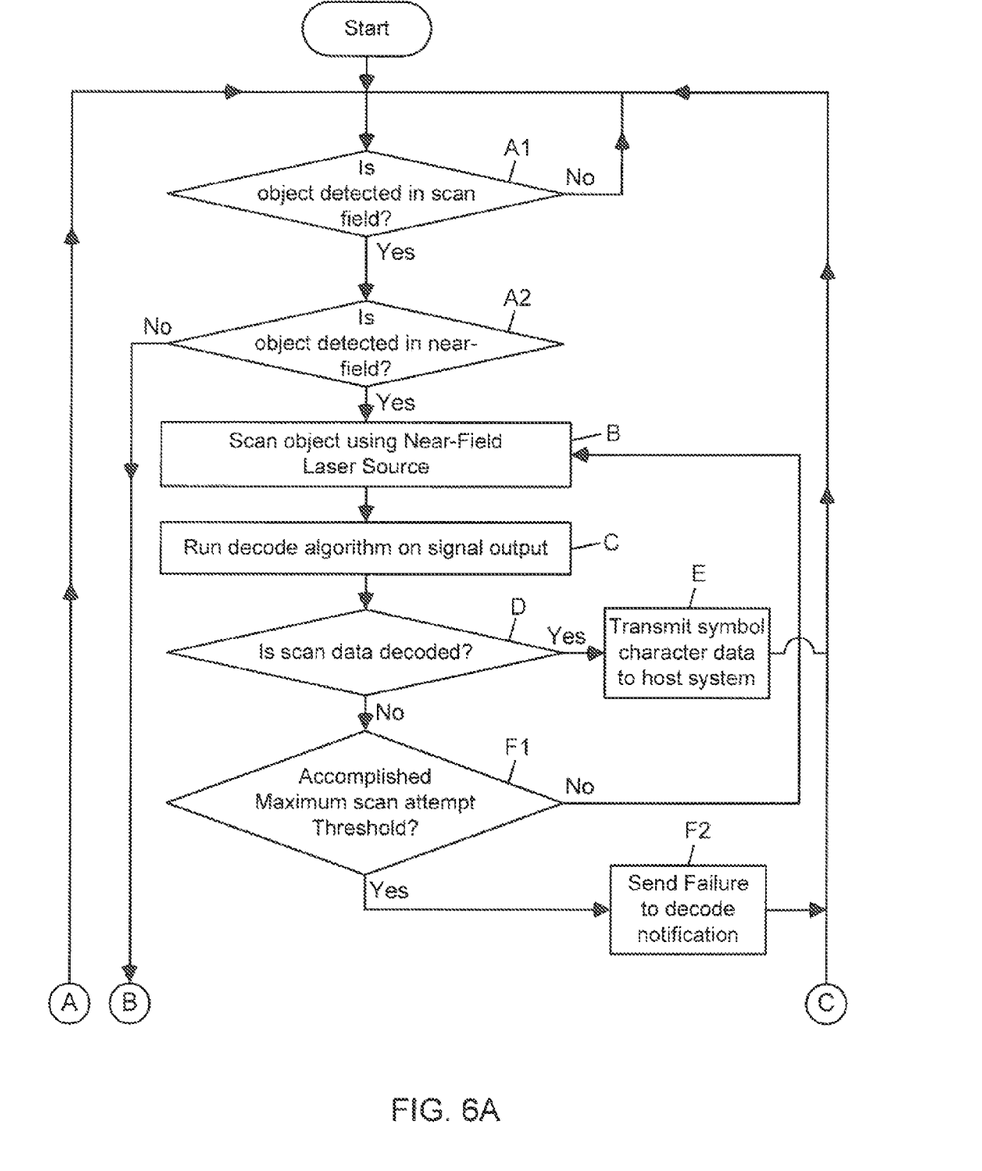
FIGS. 6A and 6B, taken together, set forth a flow chart describing the primary steps carried out in the automatically-triggered dual-laser scanning bar code symbol reading system of FIG. 1, wherein a near-field source of laser illumination or a far-field source of laser illumination is automatically selected and activated during laser scanning operations, depending on whether the object is located in either the near portion or far portion of the laser scanning field.
Figure 6B:
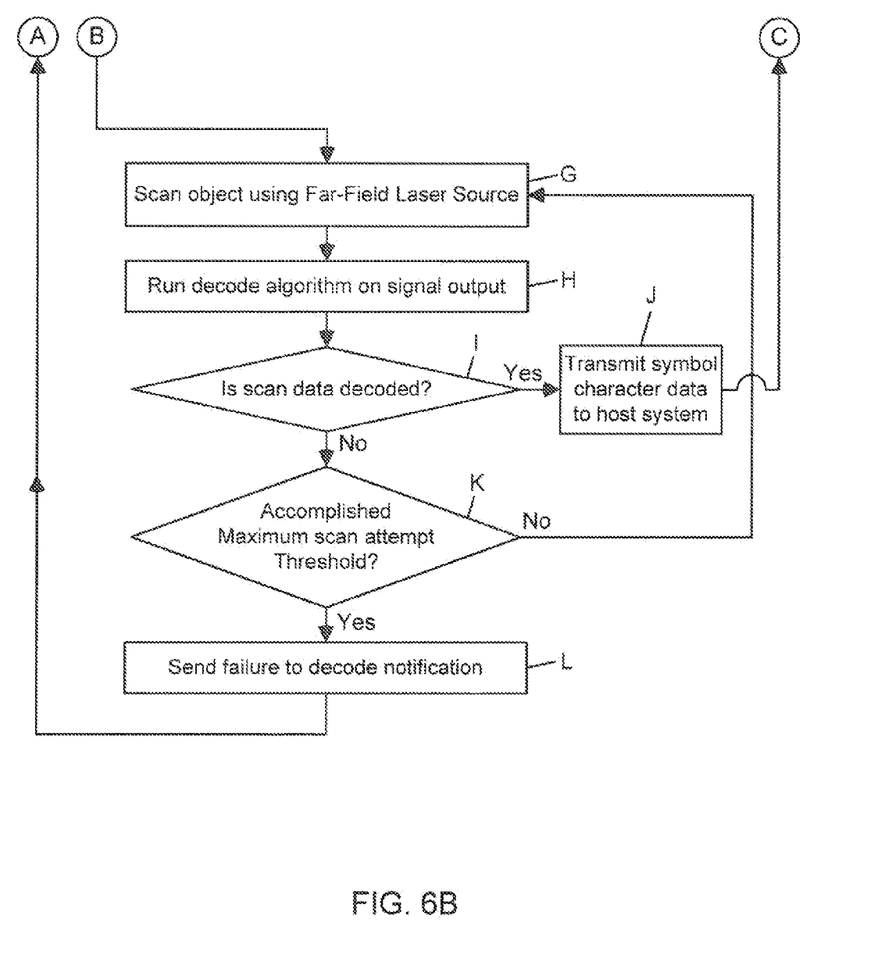

Referring to FIGS. 6A and 6B, the method of reading bar code symbols and controlling operations within the laser scanning bar code reader 500 will be described in greater detail below.

As indicated in FIG. 6A, the process orchestrated by system controller 150 begins at the START Block, where all system components are activated. As indicated at Block A1 in FIG. 6A, the system controller continues to determine when an object has been detected anywhere in the field of view (FOV), and when this event occurs, the system controller determines at Block A2 whether or not the IR-based object detection subsystem 225 detects an object in the near portion of the scanning field. In the event an object has been detected in the near portion of the scanning field, then at Block B, the system controller directs the laser scanning module 105 to scan the detected object with a laser beam generated by the near-field VLD 112A.

At Block C, the decode processor 108 runs a decode algorithm on the captured scan data, and if at Block D, a bar code symbol is decoded, then at Block E, the produced symbol character data is transmitted to the host system, and the system controller returns to Block A1. If, however, at Block D a bar code symbol is not decoded, then the system controller 150 determines at Block F1 whether or not the maximum scan attempt threshold has been reached, and if not, then the system controller 150 returns to Block B, and resumes the flow as indicated. However, if at Block F1, the system controller 150 determines that the maximum scan attempt threshold has been accomplished, then optionally, the system controller 150 proceeds to Block F2 and sends a Failure to Decode notification to the operator and returns to Block A1.

If at Block A2, an object is not detected in the near portion of the laser scanning field, then at Block G in FIG. 6B, the system controller directs the laser scanning module 105 to scan the detected object with a laser beam generated by the far-field VLD 112B. Then at Block H, one or more decode algorithms are run on the collected scan data, and at Block I, the system controller 150 determines whether or not a bar code symbol is decoded by decode processor 108. If at Block I a bar code symbol is decoded, then at Block J the produced symbol character data produced is transmitted to the host system, and system control returns to Block A1, as shown in FIG. 6A. If, however, at Block I, no bar code symbol is decoded, then the system controller 150 determines whether or not the maximum scan attempt threshold (i.e. how many attempts to decode are permitted) has been reached, and so long as the maximum number has not been reach, the system controller 150 maintains a control loop between Blocks K and G, as indicated in FIG. 6B. When the maximum number of attempts to decode has been reached at Block K, then optionally, system controller 150 sends a Failure to Decode notification to the operator, and the system returns to Block A1, as shown in FIG. 6A.

The above method of reading bar code symbols and controlling system operations is carried out in an automated manner within the laser scanning bar code symbol reader 500, wholly transparent to the operator who may be holding the system in his or her hand, or the system is supported in a stand on a countertop surface. By virtue of this unique method of control, the system is capable of reading both bar code symbols in near and far field portions of the laser scanning field, in a user-transparent manner using laser source switching during laser scan data capture and processing operations, without the complexities presented by prior art techniques and technologies.

Some Modifications which Readily Come to Mind

While the illustrative embodiments disclose the use of a 1D laser scanning module to detect scan visible and/or invisible bar code symbols on objects, it is understood that a 2D or raster-type laser scanning module can be used as well, to scan 1D bar code symbols, 2D stacked linear bar code symbols, and 2D matrix code symbols, and generate scan data signals for decoding processing.

While hand-supportable dual laser scanning systems have been illustrated, it is understood that these dual laser scanning systems can be packaged in modular compact housings and mounted in fixed application environments, such as on counter-top surfaces, on wall surfaces, and on transportable machines such as forklifts, where there is a need to scan code symbols on objects (e.g. boxes) that might be located anywhere within a large scanning range (e.g. up to 20+ feet away from the scanning system). In such fixed mounted applications, the trigger signal can be generated by manual switches located a remote locations (e.g. within the forklift cab near the driver) or anywhere not located on the housing of the system.

Also, the illustrative embodiment have been described in connection with various types of code symbol reading applications involving 1-D and 2-D bar code structures (e.g. 1D bar code symbols, 2D stacked linear bar code symbols, and 2D matrix code symbols), it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

What is claimed is:

1. A laser scanning code symbol reading system for reading code symbols comprising:
a housing with a light transmission window;
a laser scanning module, disposed in said housing, for scanning a laser beam across a laser scanning field having a near portion and a far portion defined external to said light transmission window,
wherein said laser scanning module is responsive to one or more control signals generated by a system controller and comprises:
(i) a laser drive module for driving a near-field laser source to produce a near-field laser beam focused within the near portion of said laser scanning field in response to receiving said one or more control signals from said system controller, and for driving a far-field laser source to produce a far-field laser beam in response to receiving said one or more control signals from said system controller, and
(ii) a laser scanning mechanism for scanning said near-field laser beam across said laser scanning field, and a code symbol on an object in said laser scanning field, or scanning said far-field laser beam across said laser scanning field and a code symbol on an object in said laser scanning field;
an automatic object detector disposed in said housing for automatically detecting when said object is present in only the near portion of said laser scanning field, and only generating an object detection event when said object is present in the near portion of said laser scanning field, said automatic object detector being the only object detector in the laser scanning code symbol reading system;
light collection optics, disposed in said housing, for collecting light reflected/scattered from scanned object in said laser scanning field;
a photo-detector, disposed in said housing, for detecting the intensity of collected light from said code symbols, and generating an analog scan data signal corresponding to said detected light intensity during laser scanning operations;
an analog scan data signal processor, disposed in said housing, for processing said analog scan data signals and converting the processed analog scan data signals into digitized data signals;
a programmed decode processor, disposed in said housing, for decode processing said digitized data signals, and generating symbol character data representative of each code symbol scanned by said near-field or far-field laser beam; and
an input/output (I/O) communication interface, disposed in said housing, for interfacing with a host system and transmitting symbol character data to said host system, via a communication link, supported by said laser scanning code symbol reading system and said host system;
said system controller, responsive to the generation of said object detection event, for controlling operations within said laser scanning bar code symbol reading system;
wherein when said system controller detects the generation of said object detection event, said system controller generates said one or more control signals causing said near-field laser source to generate said near-field laser beam and said laser scanning mechanism scans said near-field laser beam across a code symbol on an object in said laser scanning field during laser scanning operations, so as to generate an analog scan data signal which is processed and converted into a digitized data signal, which is then decoded processed in effort to read said code symbol on said object.

2. The laser scanning code symbol reading system of claim 1, wherein said housing comprises a hand-supportable housing.

3. The laser scanning code symbol system of claim 2, which further comprises a trigger switch integrated with said hand-supportable housing, for generating a triggering event in response to the manually pulling of said trigger switch, and wherein said system controller responds to said triggering event.

4. The laser scanning code symbol reading system of claim 1, wherein said automatic object detector is an object presence detection subsystem having a light transmitter for transmitting a light beam into said near field portion of said laser scanning field, and a light receiver for receiving said light beam after being reflected off an object in said near portion of said laser scanning field, and generating said object detection event in response thereto.

5. The laser scanning code symbol reading system of claim 4, wherein said light transmitter and said light receiver are mounted adjacent said light transmission window so as to provide an unobstructed view of an object within said laser scanning field.

6. The laser scanning code symbol reading system of claim 4, wherein said light beam has a continuous low-intensity output level, or has pulsed higher-intensity output level.

7. The laser scanning code symbol reading system of claim 1, wherein said code symbols are symbols selected from the group consisting of 1D bar code symbols, 2D stacked linear bar code symbols and 2D matrix code symbols.

8. The laser scanning code symbol system of claim 1, wherein said communication link is either a wired or wireless communication link.

9. The laser scanning code symbol reading system of claim 1, wherein, in the event that said code symbol is not read after a predetermined number of scanning and decode processing attempts, then said system controller generates said one or more control signals causing said far-field laser source to generate said far-field laser beam and said laser scanning mechanism scans said far-field laser beam across a code symbol on the object located in said laser scanning field during laser scanning operations so as to generate an analog scan data signal which is processed and converted into a digitized data signal, which is then decode processed in effort to read said code symbol on said object.

10. The laser scanning code symbol reading system of claim 9, wherein, in the event that said code symbol is not read after a predetermined number of scanning and decode processing attempts, then said system controller returns to detecting or re-detecting an object in said laser scanning field.

11. A method of reading code symbols comprising the sequence of steps of:
   (a) bringing a laser scanning code symbol reading system in proximity with an object bearing one or more code symbols, wherein said laser scanning code symbol reading system comprises:
      (i) a housing with a light transmission window;
      (ii) a laser scanning module, disposed in said housing, for scanning a laser beam across a laser scanning field having a near portion and a far portion defined external to said light transmission window, wherein said laser scanning module is responsive to one or more control signals generated by a system controller and comprises:
         (1) a laser drive module for driving a near-field laser source to produce a near-field laser beam focused within the near portion of said laser scanning field in response to receiving said one or more control signals from said system controller, or driving a far-field laser source to produce a far-field laser beam in response to receiving said one or more control signals from said system controller, and
         (2) a laser scanning mechanism for scanning said near-field laser beam across said laser scanning field, and a code symbol on an object in said laser scanning field, or scanning said far-field laser beam across said laser scanning field and a code symbol on an object in said laser scanning field;
      (3) an automatic object detector disposed in said housing for automatically detecting when said object is present in only the near portion of said laser scanning field, and only generating an object detection event when said object is present in the near portion of said laser scanning field, said automatic object detector being the only object detector in the laser scanning code symbol reading system;
      (4) light collection optics for collecting light reflected/scattered from said object in the scanning field, and a photo-detector for detecting the intensity of collected light and generating an analog scan data signal corresponding to the detected light intensity during scanning operations;
      (iii) an analog scan data signal processor, disposed in said housing, for processing said analog scan data signals and converting the processed analog scan data signals into digitized data signals;
      (iv) a programmed decode processor, disposed in said housing, for decode processing said digitized data signals, and generating symbol character data representative of each code symbol scanned by said near field laser beam and said far-field laser beam; and
      (v) an I/O communication interface for transmitting symbol character data to a host system;
   (b) detecting an object in the near portion of said laser scanning field and generating an object detection event;
   (c) in response to the generation of said object detection event, said near-field visible laser source generating said near field laser beam, said laser scanning mechanism repeatedly scanning said near field laser beam across any code symbol on the object in the near portion of said laser scanning field, said light collection optics collecting light reflected/scattered from said scanned visible code symbol in said laser scanning field, said photo-detector automatically detecting the intensity of collected light and generating an analog scan data signal corresponding to the light intensity detected during scanning operations, said analog scan data processor processing said analog scan data signal and converting the processed analog scan data signal into a first digitized data signal;
   (d) said decode processor processing said first digitized data signal in effort to read a code symbol scanned during step (c); and
   (e) in the event that said decode processor reads said code symbol during step (d), then said decode processor producing symbol character data representative of said code symbol, and said I/O communication interface transmitting said symbol character data to a host system.

12. The method of claim 11, wherein step (b) comprises generating said object detection event by automatically detecting said object in said near portion of said laser scanning field using an automatic object detector disposed in said housing.

13. The method of claim 11, wherein said housing comprises a hand-supportable housing.

14. The method of claim 13, wherein said automatic object detector is an object presence detection subsystem having a light transmitter for transmitting a light beam into said near field portion of said laser scanning field, and a light receiver for receiving said light beam after being reflected off an object in said near portion of said laser scanning field, and generating said object detection event in response thereto.

15. The method of claim 14, wherein said light transmitter and said light receiver are mounted adjacent said light transmission window so as to provide an unobstructed view of an object within said laser scanning field.

16. The method of claim 14, wherein said light beam has a continuous low-intensity output level, or has pulsed higher-intensity output level.

17. The method of claim 11, wherein said code symbols are symbols selected from the group consisting of 1D bar code symbols, 2D stacked linear bar code symbols and 2D matrix code symbols.

18. The method of claim 11, wherein said communication link is either a wired or wireless communication link.

19. The method of claim 11, wherein step (b) comprises using a trigger switch integrated with said housing, for generating a triggering event in response to the manually pulling of said trigger switch, and wherein said system controller responds to said triggering event.

20. The method of claim 11, comprising:
(f) in the event that said decode processor cannot read a code symbol during step (d) after one or more attempts at doing so, then said far-field laser source generating said far-field laser beam, said laser scanning mechanism repeatedly scanning said far field laser beam across any code symbol on the object in said laser scanning field, said light collection optics collecting light reflected/scattered from said scanned code symbol in said laser scanning field, said photo-detector automatically detecting the intensity of collected light and generating an analog scan data signal corresponding to the light intensity detected during scanning operations, said analog scan data processor processing said analog scan data signal and converting the processed analog scan data signal into a second digitized data signal;
(g) said decode processor processing said second digitized data signal in effort to read a code symbol scanned during step (f); and (h) in the event that said decode processor reads a code symbol during step (g), then said decode processor producing symbol character data representative of said code symbol, and said I/O subsystem transmitting said symbol character data to said host system.

21. The method of claim 20, which further comprises:
(i) in the event that said decoder processor cannot read a code symbol during step (g) after one or more attempts at doing so, then said system controller returns control to step (b) and resumes object detection operations.

22. A symbol reading system having a laser scanning field, comprising:
a near-field source of laser illumination for scanning an object in a near portion of said laser scanning field;
a far-field source of laser illumination for scanning an object in a far portion of said laser scanning field;
an automatic object presence detection subsystem for automatically detecting an object only in the near portion of said laser scanning field, and only generating an object detection event when an object is present in the near portion of said laser scanning field, said automatic object presence detection subsystem being the only object presence detection subsystem in the symbol reading system; and
a system controller, responsive to said automatic object presence detection subsystem, for automatically selecting and activating said near-field source of laser illumination when an object is automatically detected in said near portion of said laser scanning field.

23. The symbol reading system of claim 22, comprising:
a decode processor for decode processing signals corresponding to the intensity of light reflected from an object in said laser scanning field and generating data representative of a symbol on an object in said laser scanning field;
wherein, in the event that a symbol is not read after a predetermined number of scanning and decode processing attempts, then said system controller returns to detecting or re-detecting an object in said laser scanning field.

24. The symbol reading system of claim 22, wherein said automatic object presence detection subsystem comprises:
a light transmitter for transmitting a light beam into said near field portion of said laser scanning field; and
a light receiver for receiving said light beam after said light beam is reflected off an object in said near portion of said laser scanning field.

* * * * *